(12) United States Patent
Cahill (10) Patent No.: US 7,946,165 B2
(45) Date of Patent: May 24, 2011

(54) OVER-SPEED, ROUGH LOADS AND HARD LANDING DETECTION SYSTEM

(75) Inventor: Eric D. Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 73 days.

(21) Appl. No.: 12/435,702

(22) Filed: May 5, 2009

(65) Prior Publication Data

US 2010/0281967 A1    Nov. 11, 2010

(51) Int. Cl.
    *E01C 23/00*    (2006.01)
(52) U.S. Cl. ....................................................... 73/146
(58) Field of Classification Search ................... 73/146; 340/442, 572.8; 701/1, 29
See application file for complete search history.

(56) References Cited

U.S. PATENT DOCUMENTS

| | | | | |
|---|---|---|---|---|
| 3,870,376 A | * | 3/1975 | Riordan | .................. 303/122.04 |
| 2008/0004763 A1 | * | 1/2008 | Johnson et al. | ................. 701/29 |

* cited by examiner

*Primary Examiner* — Jewel Thompson
(74) *Attorney, Agent, or Firm* — Snell & Wilmer L.L.P.

(57) ABSTRACT

A system, apparatus and method provide a means for indicating an overload condition has occurred during aircraft operation. The occurrence of an overload condition is automatically determined and an indication output thereof. Based on the indication received by the cockpit, avionics, maintenance, etc., further action may be taken to correct the effects of the overload condition on the tires and/or landing gear.

13 Claims, 9 Drawing Sheets

OVER-SPEED, ROUGH LOADS AND HARD LANDING DETECTION SYSTEM

FIELD OF THE INVENTION

The present invention relates generally to vehicle maintenance, and more particularly to detecting when maintenance is required for aircraft components.

BACKGROUND

As an aircraft lands, it is preferable that the landing speed, angle of decent, and rate of decent are within prespecified limits. This minimizes the chance of overloading components of the aircraft, which can lead to fatigue and/or failure of the components. For safety reasons, routine inspections of the landing gear and tires of an aircraft are carried out to check for signs that the tires and landing gear have not exceeded their operational limits. Such inspections are typically carried out at prespecified intervals, or when the maintenance crew is made aware of circumstances that may have overloaded the tires and/or landing gear (e.g., the pilot reports a rough landing).

During the inspections, maintenance personnel physically inspect the tires and landing gear for signs of stress and/or damage. As can be appreciated, such maintenance inspections are time consuming. Moreover, the inspections require the aircraft to be taken out of service, resulting in lost revenue for the airline.

A drawback to conventional methods for maintaining aircraft tires and landing gear is that presently there is no way to actually know when such inspections are required. For example, a pilot may believe that he had a "rough landing" and, thus, recommend inspection of the aircraft, when in fact the landing was well within acceptable limits. Conversely, the pilot may believe the landing was not excessively rough and, therefore, not recommend inspection of the aircraft, when in fact loads experienced during landing exceeded maximum recommended parameters.

SUMMARY OF INVENTION

The present invention provides a system, apparatus and method for indicating an overload condition has occurred during aircraft operation. More particularly, the system, apparatus and method automatically determine the occurrence of an overload condition and output an indication thereof. Based on the indication, which may be provided to the cockpit, avionics bay, maintenance terminal, etc., further action may be taken to correct the effects of the overload condition on the tires and/or landing gear.

An overload condition occurs when the tires and/or landing gear have experienced a load and/or velocity that exceeds recommended specifications. The system, apparatus and method in accordance with the present invention receives data indicative of at least one of a load placed on a tire or an angular velocity of the tire. The received data then is compared to a prespecified threshold, and based on the comparison an output is provided indicative of whether or not maintenance is required on one or more tires and/or landing gear corresponding to the one or more tires. The overload condition output, for example, may correspond to at least one of a tire overspeed condition, a tire overload condition, or a landing gear overload condition. For example, if a tire exceeded its maximum speed rating, an overload condition of the tire may be automatically determined and reported to the maintenance personnel.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

DETAILED DESCRIPTION

Figure 1:
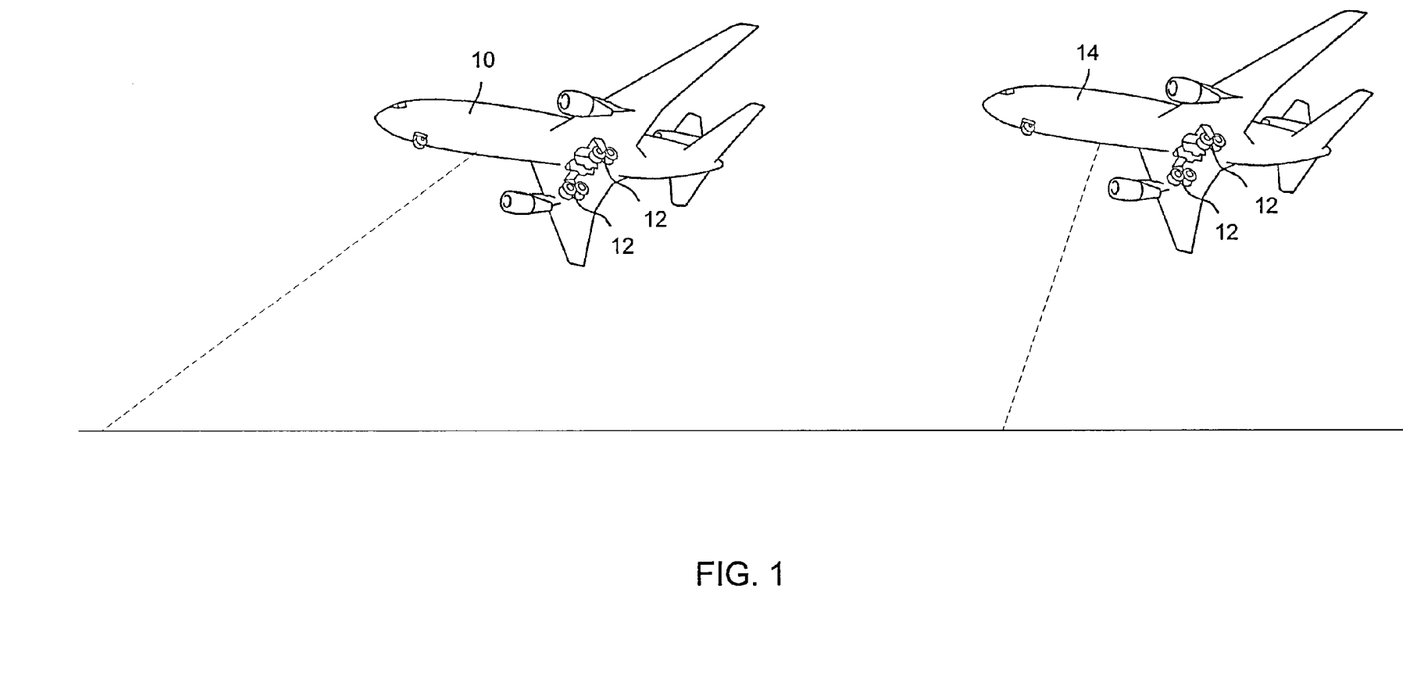
FIG. 1 is a schematic diagram illustrating exemplary aircraft during different landing scenarios.

The principles of the invention will now be described with reference to the drawings. Referring initially to FIG. 1, there is shown two aircraft 10 and 14 approaching a runway at different angles. As shown, the aircraft 10 is approaching at a normal angle and rate of decent, and will touchdown without the tires and/or landing gear 12 experiencing any overload conditions. This may be considered a normal landing. The aircraft 14, however, due to its steep angle of decent (or high rate of decent and/or high landing speed), will experience a rough landing, and the tires and/or landing gear 12 may possibly experience loads and/or velocities that exceed recommended specifications.

A system, apparatus, and method in accordance with the present invention enables automatic detection of an overload condition of the tires and/or landing gear 12 of the aircraft. An overload condition occurs when the tires and/or landing gear 12 have experienced a load and/or velocity that exceeds recommended specifications. In accordance with the present invention, parameters of the aircraft are monitored, and when these parameters have exceeded prespecified thresholds, a notification is provided to the flight crew and/or maintenance personnel that the specific components require inspection and/or maintenance. In this manner, unneeded inspections due to pilot misperceptions are minimized, thereby saving maintenance costs and minimizing down time for the aircraft. Moreover, unperceived rough landings or overspeeds during landing and/or takeoff are automatically detected, thereby ensuring inspection of the components and enhancing aircraft safety.

The system, apparatus and method in accordance with the present invention receives data indicative of at least one of a load placed on a tire or an angular velocity of the tire. The received data then is compared to one or more prespecified thresholds, and based on the comparison an output is provided indicative of whether or not maintenance is required on one or more tires and/or landing gear corresponding to the one or more tires. The system, apparatus, and method in accordance with the invention can be configured to provide an output that corresponds, for example, to at least one of a tire overspeed condition, a tire overload condition, or a landing gear overload condition.

Figure 2:
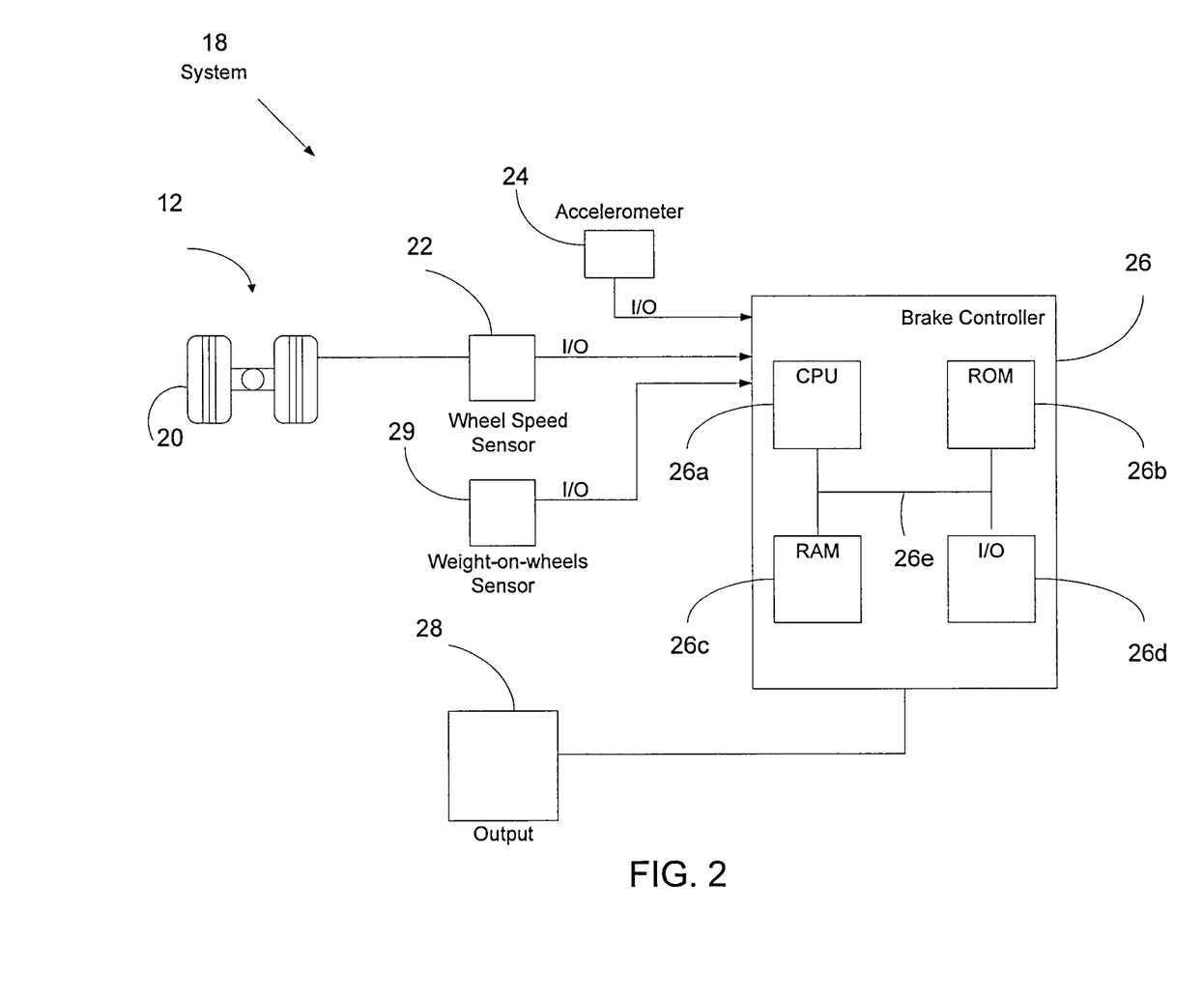
FIG. 2 is a schematic diagram of an exemplary brake control system in accordance with the invention.

Referring to FIG. 2, a schematic diagram of an exemplary brake control system 18 in accordance with the invention is shown. The system 18 includes a brake controller 26 for controlling overall operation of the brake system. The brake controller is generally a conventional brake controller, except for the maintenance monitoring functions in accordance with the invention. The brake controller 26 includes a microprocessor 26a, read only memory (ROM) 26b, random access memory (RAM) 26c, and input/output module 26d, each of which are communicatively coupled via a system bus 26e or the like. A maintenance program in accordance with the present invention can reside in ROM 26b and can be executed by the microprocessor 26a so as to implement a maintenance monitoring function in accordance with the invention. While the maintenance monitoring function is preferably implemented within the brake controller, it may be implemented separate from the controller. Additionally, the maintenance monitoring function may be fully implemented via software, hardware, or a combination thereof. Further details with respect to the maintenance function are described below with respect to FIGS. 3 and 4.

An output device 28, such as a light, annunciator panel, or the like, can be located in the aircraft cockpit, avionics bay, etc. so as to provide information indicative of whether or not maintenance is required for the tires and/or landing gear. While only a single output device 28 is shown, there may be multiple output devices 28 throughout the aircraft as desired.

A wheel speed sensor 22 is operatively coupled to an input of the brake controller 26. The wheel speed sensor 22 is configured to provide data indicative of a velocity of a corresponding tire 20 on the landing gear 12. The wheel speed sensor can be an encoder, an AC or DC tach, a resolver, a Hall effect sensor, or any other device that can be used to measure a change in relative position with respect to time. Preferably, the wheel speed sensor 22 is located on the landing gear and operatively coupled to the rotatable wheel 20.

An accelerometer 24 may also be operatively coupled to an input of the brake controller 26, wherein the accelerometer 24 is configured to provide data indicative of acceleration of the aircraft. Preferably, the accelerometer is a three-axis accelerometer that can detect acceleration in the x, y and z axes, and may be a MEMS-based accelerometer, for example. Such accelerometers are well known in the art and therefore are not described in detail herein. Preferably, the accelerometer 24 is located on each landing gear (e.g. on one or more brakes), although it may be located within the aircraft (e.g., in the wheel wells) and/or in the brake control unit to provide additional acceleration data. Although only a single wheel speed sensor 22 and accelerometer 24 are shown in FIG. 2, it should be appreciated that the controller 26 may receive data from multiple wheel speed sensors and accelerometers.

The signal provided by the wheel speed sensor 22 and accelerometer 24 may be an analog signal (e.g., a 0-5 VDC signal or a 4-20 mA signal), or a digital signal communicated via a communication bus. Data from the wheel speed sensors 22 and accelerometers 24 may be directly provided to the brake controller 26, or an intermediate device, such as a data concentrator, may be used to provide the data to the brake controller 26.

Figure 3:
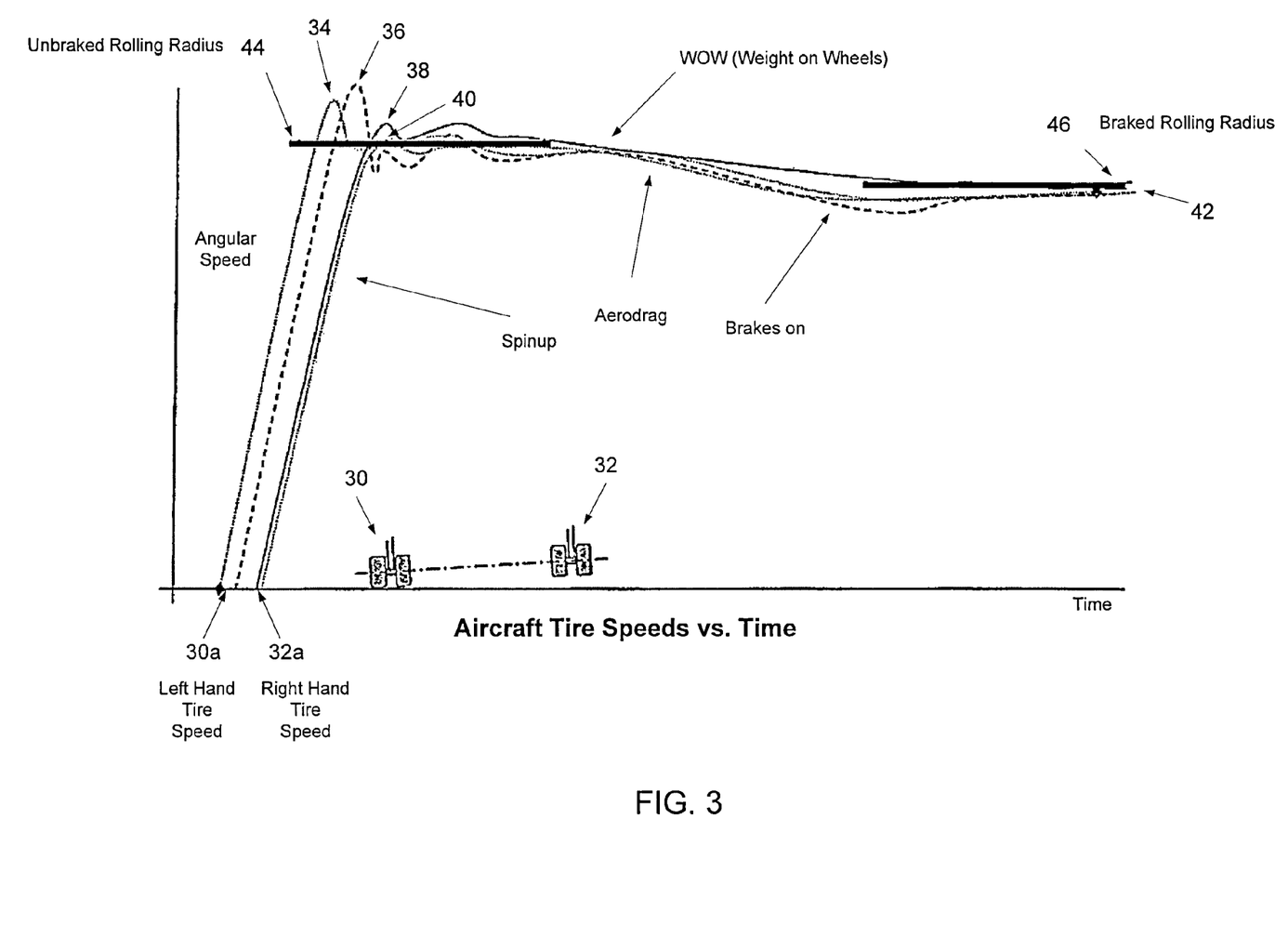
FIG. 3 is an exemplary graph showing simulated wheel speeds.

Referring now to FIG. 3, there is shown an exemplary graph illustrating wheel speed data, wherein angular wheel velocity is shown in relation to time (wheel velocity is a highly accurate measurement in the brake control system). Left hand tire velocities 30a and right hand tire velocities 32a are each represented by two lines. The manner of touchdown of the left hand tires 30 and right hand tires 32 as shown in FIG. 3 indicates the vertical velocity and aircraft roll angle.

As shown in FIG. 3, the angular velocities of the left hand tires 30 and the right hand tires 32 are at zero prior to touchdown. In this example, when the aircraft touches down, the left hand tires 30 contact the ground before the right hand tires 32 and thus absorb more of the load. This causes the left hand tires to compress more (their diameters become smaller) than the right hand tires and therefore the angular velocities of the left hand tires 30 are higher than the angular velocities of the right hand tires 32. The maximum velocities reached by the left hand tires 30 are represented as 34 and 36, while the maximum velocities reached by the right hand tires 32 are represented as 38 and 40. After touchdown, the velocities 30a and 32a for left and right hand tires 30 and 32 gradually reduce until the aircraft comes to an even rolling state at 42. The even rolling state 42 represents that the tires have settled into a steady state diameter and that all the tires are rotating at about the same angular velocity. Other events represented by the graph include the unbraked rolling radius 44 and the braked rolling radius 46, which show how the aircraft rolls upon touchdown. The unbraked rolling radius 44 providing a more accurate rolling radius than the braked rolling radius 46 because braking can change the rolling radius of the tires. These representations assume that the pressure of the tires is correct (aircraft tires are highly maintained).

As is known in the art, aircraft tires have a maximum rated speed. If this maximum rated speed has been exceeded, the physical integrity of the tires may be compromised. Further, aircraft tires and landing gear have a maximum load rating. Exceeding the maximum load rating may also compromise the integrity of the tires and/or landing gear. Thus, it is desirable to determine if the tires have exceeded their maximum speed rating and/or if the tires and landing gear have exceeded their maximum load rating.

To automatically determine if the tires have exceeded the maximum rated speed, the controller 26 monitors the angular velocity of the tires (via the wheel speed sensor 22) during takeoff, landing, and taxi and compares the angular velocity to a corresponding prespecified velocity threshold. Preferably, data from the wheel speed sensors is filtered prior to the comparison to minimize the likelihood of noise in the wheel speed data. If the wheel speed data exceeds the velocity threshold, then the output 28 is activated.

The velocity threshold may be a single occurrence threshold, or may be multiple thresholds that denote different levels of severity, such as a first level overspeed (e.g., overspeed within 1% of maximum rated speed, which may be referred to as a low level overspeed), a second level overspeed (e.g., overspeed greater than 10% of maximum rated speed, which may be referred to as a high level overspeed), etc. Based on the comparison of the tire angular velocity and the velocity thresholds, the controller 26 can conclude that a tire overspeed condition has or has not occurred, as well as the severity of the overspeed. Further, the controller 26 may conclude that although the tire angular velocity exceeded the velocity threshold, the velocity was not high enough to require immediate inspection (e.g., a low level overspeed), thereby allowing the aircraft to remain in service. However, if multiple "low level" overspeed conditions have been detected, then the controller 26 can indicate that maintenance is required. If the angular velocity of each tire did not exceed the velocity threshold, then no indication need be made.

Another overspeed determination can be made by calculating, over the life of each tire, the total time the tire is in an overspeed condition. For example, integrating the tire overspeed value (e.g., in radians per second) with respect to time (replace being when the tires need replaced and new being when the tires are new) as shown in Equation 1 gives the sum of the overspeed conditions with respect to time. When this value exceeds a corresponding threshold, an indication can be output that the tire requires service or inspection. To ensure an accurate representation of the cumulative time the tire is in an overspeed condition, the integrator is reset when a new tire is installed on the vehicle.

$$\int_{NEW}^{REPLACE} OS \, dt \qquad \text{Equation 1}$$

wherein OS is the wheel velocity in excess of the overspeed threshold

Similarly, integrating the tire overspeed value (e.g., in radians per second) with respect to distance as shown in Equation 2 gives the sum of the overspeed conditions with respect to distance. When this value exceeds a corresponding threshold, an indication can be output that the tire requires service or inspection.

$$\int_{NEW}^{REPLACE} OS \, d\theta \qquad \text{Equation 2}$$

wherein OS is the wheel velocity in excess of the overspeed threshold

In addition to monitoring for tire overspeed, the controller 26 in accordance with the present invention also can monitor for overload conditions of the tires and/or landing gear. To determine if a tire or landing gear overload condition has occurred, the controller 26 is configured to determine the load placed on the tire and/or landing gear, and compare the determined load to a corresponding prespecified load threshold.

To determine the load on the tire and/or landing gear, the controller 26 can be configured to determine a first angular velocity of the tire (e.g., a peak velocity) during a first time period after aircraft touchdown, and a second angular velocity (e.g., a settled velocity) of the same tire during a second time period after aircraft touchdown, the second time period occurring subsequent to the first time period. Preferably, the first time period is within one to two seconds after weight on the wheels has been detected (e.g., as detected by the weight-on-wheels sensor 29), and the second time period is between two to five seconds after weight has been detected on the wheels. The controller 26 is then configured to calculate a radius of the tire during the first time period based on the first (peak) angular velocity, the second angular velocity, and the known normally loaded tire diameter. This is accomplished by using an equation to derive the radius of the tire during the first time period. The equation is set up using the known radius of the tire when settled and the first and second angular velocities. For example, using the equation $d_1 v_1 = d_2 v_2$, where $d_2$ is 50 inches (the tire has a settled diameter of 50 inches), $v_1$ is 110 radians/second (angular velocity at time of touchdown) and $v_2$ is 100 radians/second (angular velocity a predetermined time after touchdown when tire diameter has settled), solving for $d_1$ gives a minimum tire diameter upon touchdown of 45.45 inches.

The change in tire diameter may be expressed in terms of tire deflection. Based on the calculated tire diameter and the known diameter of the tire on the aircraft under normal conditions, the deflection of the tire can be determined by taking the difference of the two diameters, e.g., the diameters are subtracted from one another and the difference represents the deflection of the tire. In the above example, subtracting 45.45 from 50 gives a deflection of 4.55 inches. The controller 26 is configured to use the determined deflection along with a deflection-to-load curve corresponding to the tire to approximate the load on the tire at the time of landing. The approximation is done by selecting the proper curve (curves A-I) from FIG. 4, which are deflection-load curves corresponding to the tires on the aircraft and may be stored in memory of the BSCU. The tire deflection in inches is represented on the y-axis of the graph, and the load in KIPS (1 KIP is 1000 pounds force) is represented on the x-axis of the graph. Each line on the graph represents a different tire pressure. If different tires are used, with each tire having different deflection curves, the system would need to know which tire is on the aircraft to make the determinations.

Figure 4:
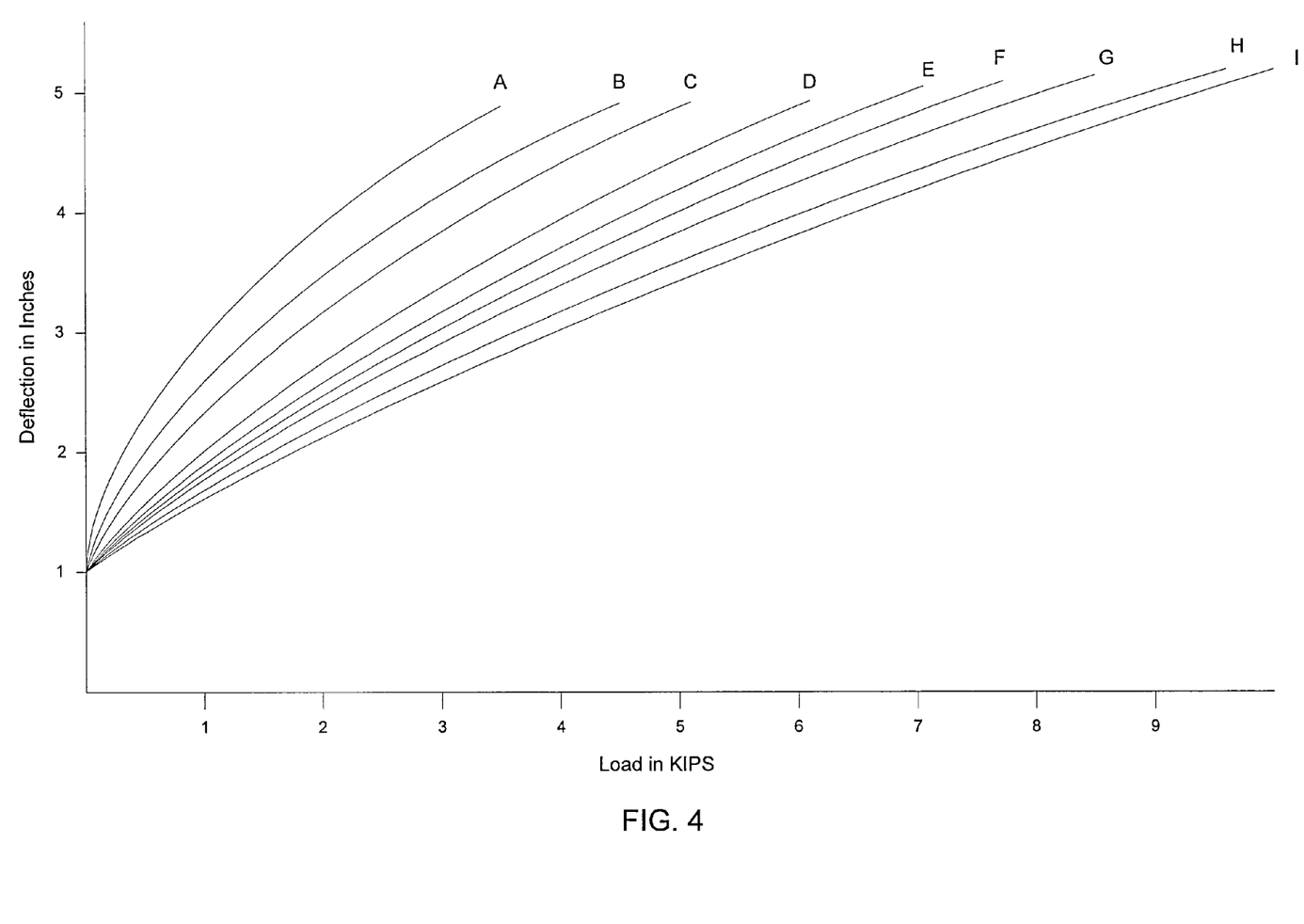
FIG. 4 is an exemplary graph showing simulated load-deflection curves that can be used with the present invention.

After determining the proper curve on the graph (e.g., based on known or estimated tire pressure), and by going to the determined deflection on that curve, a corresponding load on the tire can be determined. Using, for example, curve A, the load would be approximately 2.8 KIPS. If tire pressure indicator system data is available, more accurate tire pressure data would be available, which would allow for more accurate deflection-load determinations. Additionally, to improve fidelity of the tire pressure, temperature data from a Brake Temperature Monitoring System (BTMS) can be used. Temperature sensors can be located inside each brake, onboard the aircraft, and within the airframe. Based on ambient conditions, the tire pressure differences can be estimated, and the accuracies of the estimate can be increased based on known brake orientations and operational histories. For example, it is known when heat is added due to braking and when an aircraft has been idol or flying without braking, and that known information can be used to create BTMS temperature curves. Using the BTMS temperature curves and rudimentary ambient conditions, the change in tire pressure can be derived, thereby increasing the fidelity of the tire deflection calculation. Provided that the slope of the BTMS temperature curve is small, it can be assumed that the brakes, wheels and tires are nearly equal temperatures. Using the known tire deflection during taxi and roll for takeoff, the tire deflection can be understood at a static point. Using a derived landing load can further add to the fidelity of the tire deflection.

After the load has been determined, the controller 26 then compares the determined load placed on the tire to the load threshold and, if the load on the tire exceeds the load threshold, concludes an overload condition has occurred for the tire and/or landing gear corresponding to the tire. For example, if the threshold is 2 KIPS, then a load of 2.8 KIPS would exceed the threshold and an indication that the tire requires inspection, taken out of service, etc. is output. The deflection to load curve can be stored in memory 26b of the controller 26 and retrieved when needed.

Another overload determination can be made by calculating the cumulative effect of the load on each tire over the life of the tire. For example, integrating the tire overload value (e.g., in pounds) with respect to time as shown in Equation 3 over the life of the tire (replace being when the tire needs to be replaced and new being when the tire is new) gives the sum of the overload conditions with respect to time. When this value exceeds a corresponding threshold, an indication can be output that the tire requires service or inspection. Again, the integrator should be reset when a tire is replaced to ensure data from a previous tire is not considered for the new tire.

$$\int_{NEW}^{REPLACE} OL\,dt \qquad \text{Equation 3}$$

wherein OL is the load on the tire in excess of the overload threshold

Similarly, integrating the tire overload value (e.g., in pounds) with respect to distance as shown in Equation 4 over the life of the tire gives the sum of the overload conditions with respect to distance. When this value exceeds a corresponding threshold, an indication can be output that the tire requires service or inspection.

$$\int_{NEW}^{REPLACE} OL\,d\theta \qquad \text{Equation 4}$$

wherein OL is the load on the tire in excess of the overload threshold

While the above refer to determining the load on a tire, a similar procedure may be implemented for determining a load on the landing gear. For example, to determine the load on the landing gear, the load on each tire of the landing gear is first determined, and then the entire landing gear load is estimated based on the determined tire loads for that landing gear.

The tire or landing gear overload condition may indicate that the aircraft touched down with such a force that the aircraft needs to be taken out of service immediately. Alternatively, the tire or landing gear overload condition may indicate that although the load exceeded the load threshold, the load was not high enough to require immediate inspection, taking the aircraft out of service, etc. (e.g., the overload condition was within a prespecified range, such as 1%, of the maximum rated load). This condition may be logged, but notification of maintenance may be delayed for a prespecified amount of time. Upon expiration of the time period, or upon the occurrence of another overload, the output 28 may be provided indicating that maintenance is required. If the load placed on the tire or landing gear did not exceed the load threshold, then no indication need be made. Also, like the velocity threshold described above, there may be multiple levels of load thresholds, each corresponding to a different level of overload.

Instead of basing overload conditions on measured wheel velocity, a rough or hard landing may be determined based on data from the accelerometer 24. In this regard, the controller 26 can be configured to determine a rate of vertical descent of the aircraft at the time of aircraft touchdown, and/or the rate of change in vertical decent at the time of touchdown. The controller 26 can then compare the determined rate of vertical decent and/or rate of change in vertical descent to a prespecified decent threshold and/or a prespecified rate of change in decent threshold. If the rate of vertical descent or rate of change in vertical decent of the aircraft exceeds the respective decent thresholds, the controller 26 can conclude that a hard landing condition has occurred for the tires and/or landing gear corresponding to the particular accelerometer. An indication may be output that the aircraft should be inspected, taken out of service, etc., immediately (a severe hard landing wherein the prespecified decent threshold is exceeded by a certain percentage) or upon the next hard landing (e.g., moderate hard landing wherein the rate of vertical decent and/or rate of change of vertical decent are at or about the decent thresholds). If the rate of vertical descent and/or rate of change in vertical decent does not exceed the respective decent thresholds, then no indication need be made. Additionally, the information from the accelerometers could be compared to determine the g-forces experienced by the aircraft and how the g-forces were transmitted to various parts of the aircraft (e.g. the landing gear), and that information could be output.

Alternatively, the load on the landing gear can be derived using an accelerometer on or in the BSCU and an accelerometer on one or more brakes. More particularly, the difference in load seen at the brake relative to the load seen at the BSCU must be absorbed by the landing gear. Thus, by taking the difference of the data seen by the accelerometer at the brake and the accelerometer at the BSCU, the load placed on the landing gear can be derived.

Another way of determining the occurrence of potential overload conditions is by using an aircraft model of the landing gear. Such models may be created using the known geometry of a landing gear and the maximum landing conditions that may be experienced by the landing gear. From the model of the landing gear, the accelerations and the loads on the landing gear are estimated. For example, using information such as the aircraft roll angle, the forces on the landing gear can be estimated based on the load, magnitude and angle of forces, etc, or the drag forces from braking could be estimated. Further, using known information such as when an aircraft touches down and that a tire will deflect upon landing, the sink rate can be estimated. Still further, knowing when the other landing gear touchdown allows the difference in time between the landing gears to be determined.

Additionally, using the force of compression, where the spring force equals $K_x$ in a simple model, the side-to-side angle that a landing gear touches down can be determined. If the angle is too large, a determination can be made of an overload of side force, and the angle can be confirmed by looking at the touchdown times and tire deflections between two tires on the same landing gear. Also, using prespecified acceptable limits of load and angle, components of the landing gear that receive too high of a load can be determined. For example, if the aircraft lands at 30 degrees on one gear, the overload limit may be much less than the overload limit when the aircraft is not experiencing any roll. If the aircraft has experienced an overload condition based on the aft angle loads or roll loads, an indication can be output that the landing gear requires service or inspection.

A hard landing determination for the landing gear can also be made by calculating the cumulative effect of the hard landing on the landing gears over the life of the landing gears. For example, integrating the tire overload value (e.g., in pounds) with respect to time as shown in Equation 5 over the life of the landing gear (refurb being when the landing gears need refurbished and new being when the landing gear are new) provides the sum of the overload conditions with respect to time. The integral in this example is for a four wheel aircraft (two wheels on each landing gear), with the accumulated overload being shown for the left hand landing gear. When this value exceeds a corresponding threshold, an indication can be output that the landing gear requires service or inspection. To make the determination, the integrator should be reset when new landing gear are installed or after landing gear have been serviced.

$$\int_{NEW}^{REFURB} OL\,dt \qquad \text{Equation 5}$$

wherein OL is the combined load on the inside and outside brakes of the landing gear in excess of the overload threshold Similarly, integrating the landing gear overload value (e.g., in pounds) with respect to distance as shown in Equation 6 over the life of the landing gear gives the sum of the overload conditions with respect to distance. When this value exceeds a corresponding threshold, an indication can be output that the landing gear requires service or inspection.

$$\int_{NEW}^{REFURB} OL\,d\theta \qquad \text{Equation 6}$$

wherein OL is the combined load on the inside and outside brakes of the landing gear in excess of the overload threshold Additionally, integrating the acceleration (in g's) that the landing gear exceeded the threshold value with respect to time as shown in Equation 7 over the life of the landing gear gives the sum of the accelerations in excess of the threshold with respect to time. When this value exceeds a corresponding threshold, an indication can be output that the tires require service or inspection.

$$\int_{NEW}^{REFURB} OA\,dt \qquad \text{Equation 7}$$

wherein OA is ½ the combined force on the inside and outside brakes of the landing gear in excess of the acceleration threshold Integrating the acceleration (in g's) with respect to distance as shown in Equation 8 over the life of the landing gear gives the sum of the accelerations in excess of the threshold with respect to distance. When this value exceeds a corresponding threshold, an indication can be output that the landing gear requires service or inspection.

$$\int_{NEW}^{REFURB} OA\,d\theta \qquad \text{Equation 8}$$

wherein OA is ½ the combined force on the inside and outside brakes of the landing gear in excess of the acceleration threshold Integrating the acceleration (in g's) of the landing gear with respect to time as shown in Equation 9 over the life of the landing gear using the shock experienced by the landing gears as a threshold value, gives the sum of the forces in excess of the threshold on landing gear with respect to time. When this value exceeds a corresponding threshold, an indication can be output that the landing gear require service or inspection.

$$\int_{NEW}^{REFURB} OA\,dt \qquad \text{Equation 9}$$

wherein OA is the force on the landing gear in excess of the shock threshold

Integrating the acceleration (in g's) of the landing gear with respect to distance as shown in Equation 10 over the life of the landing gear using the shock experienced by the landing gears as a threshold value, gives the sum of the forces in excess of the threshold on landing gear with respect to distance. When this value exceeds a corresponding threshold, an indication can be output that the landing gear requires service or inspection.

$$\int_{NEW}^{REFURB} OA\,d\theta \qquad \text{Equation 10}$$

wherein OA is the force on the landing gear in excess of the shock threshold

In addition to overspeed and overload detection, the aircraft sink rate (feet/second) at the time of touchdown also can be determined. As discussed above with respect to FIG. 1, two aircrafts 10 and 14 are shown approaching the runway at different angles. Aircraft 10 touches down experiencing a normal sink rate, while aircraft 14 touches down experiencing an irregular and faster sink rate. Generally, the faster the sink rate of the aircraft, the more likely it is that the aircraft will experience a hard landing and require inspection. The controller 26 may be configured to calculate the sink rate at the time of landing based on the measurements from the accelerometer, and may be configured to take into account parameters such as air temperature, wind direction, wind speed, etc.

The controller 26 can also be configured to determine runway conditions upon touchdown of the aircraft using the rate of wheel spinup. More specifically, by knowing the inertia of the wheel, tire and/or brake and measuring the rate of wheel spinup, the controller 26 can determine a coefficient of friction of the runway, from which the controller 26 can determine the runway conditions. This will allow a differentiation to be made, for example, between a hard landing on an icy runway and a safe landing on a dry runway. This information can also be reported and used by other aircrafts or used as basic runway data.

Figure 5:
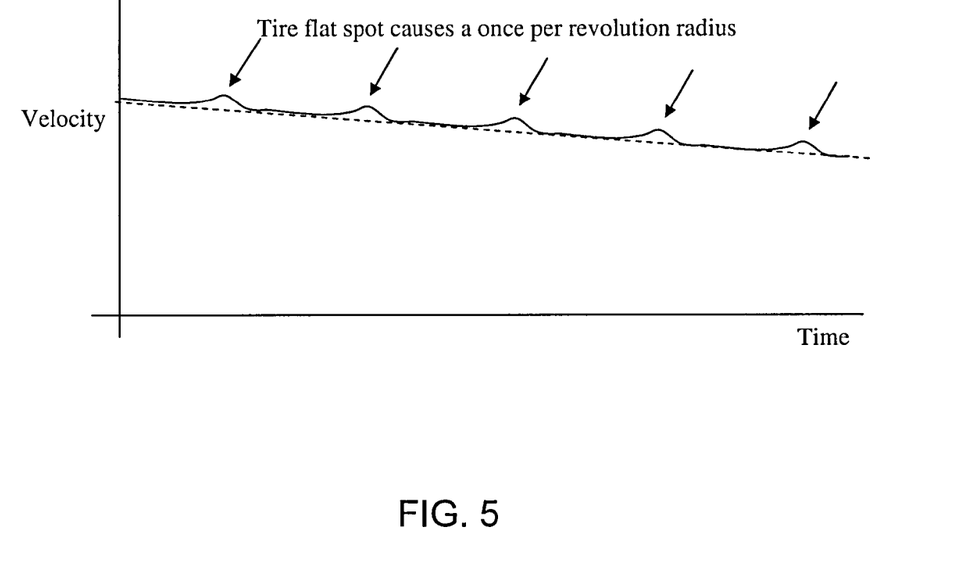
FIG. 5 is an exemplary graph showing an aircraft under constant acceleration where the wheel speed indicates a tire flat spot.
Figure 6:
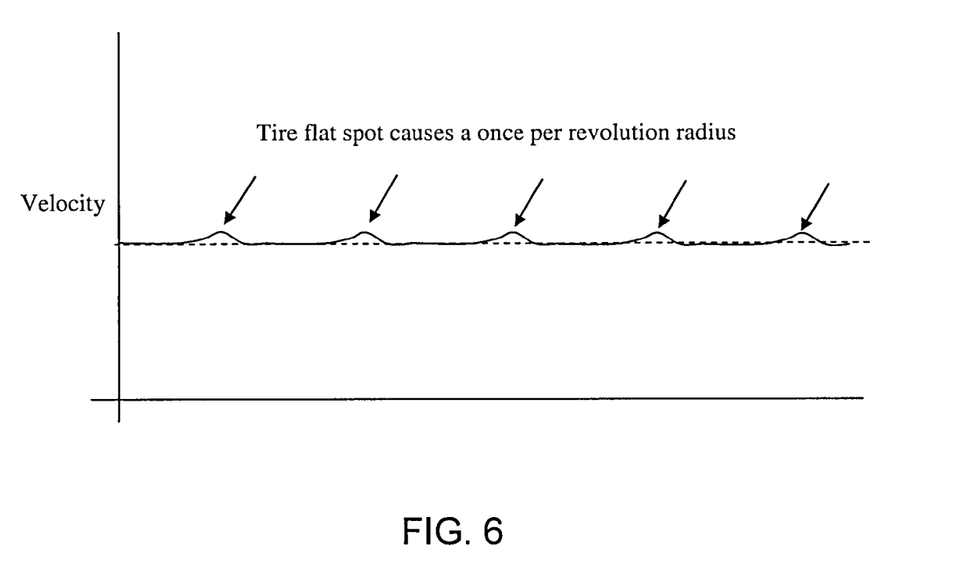
FIG. 6 is an exemplary graph showing an aircraft at constant speed where the wheel speed indicates a tire flat spot.

Referring now to FIGS. 5 and 6, there are shown exemplary graphs illustrating tire velocity change due to flat spots. FIG. 5 illustrates an aircraft under constant acceleration where the wheel speed indicates a tire flat spot, and FIG. 6 illustrates an aircraft at constant speed where the wheel speed indicates a tire flat spot. The tire flat spots cause a change in tire radius every revolution, which causes the velocity of the tire to jump as the tire rolls over the flat spot. The controller can monitor for such out-of-round tires, i.e., tires with a flat spot, tires with a bump, etc., by checking for velocity changes that occur once per revolution, and then can output an indication of the tire being out-of-round to the cockpit, avionics bay, maintenance terminal, etc.

Figure 7:
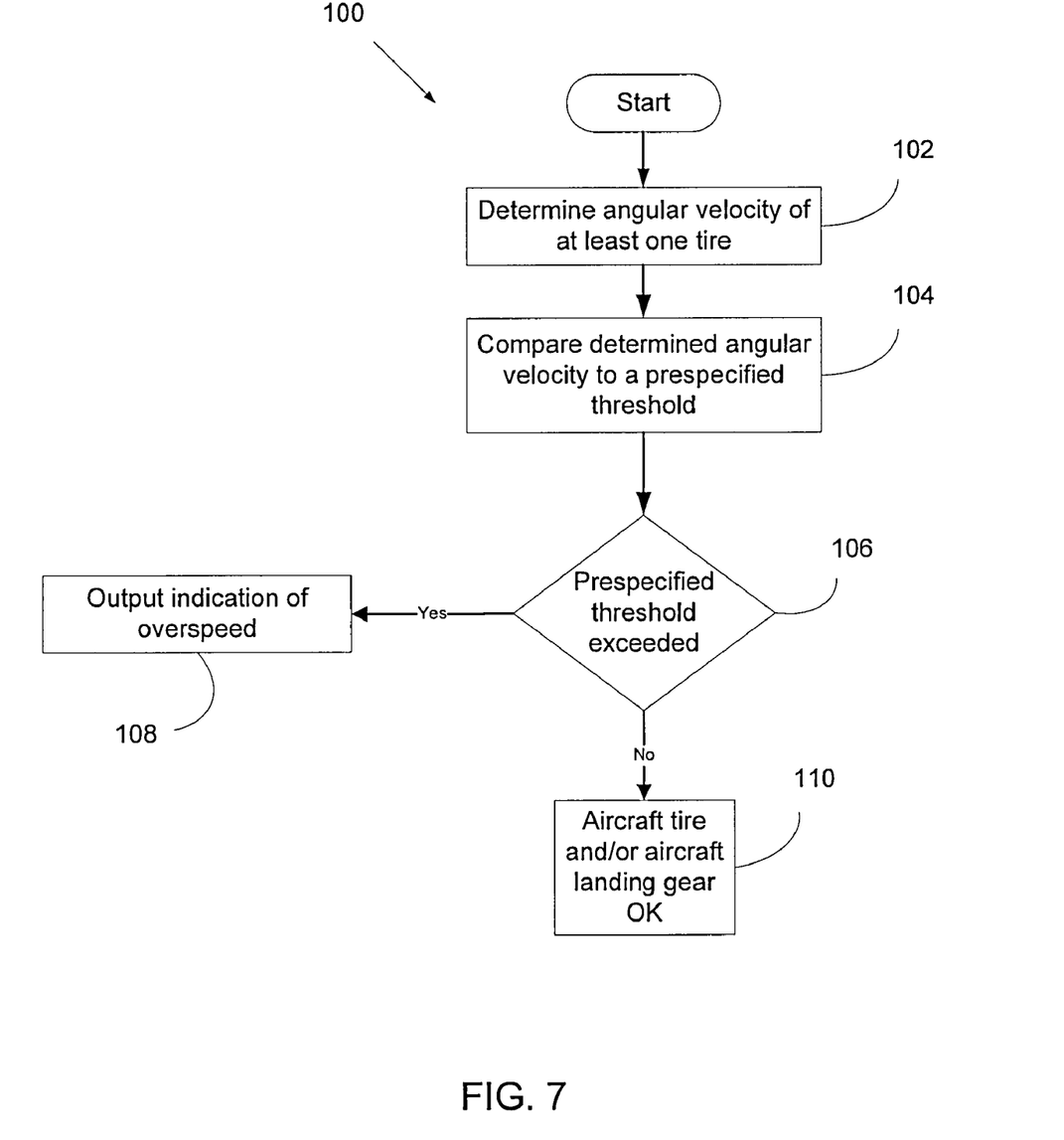
FIG. 7 is a flow chart illustrating exemplary steps for indicating an overspeed condition in accordance with the invention.
Figure 8:
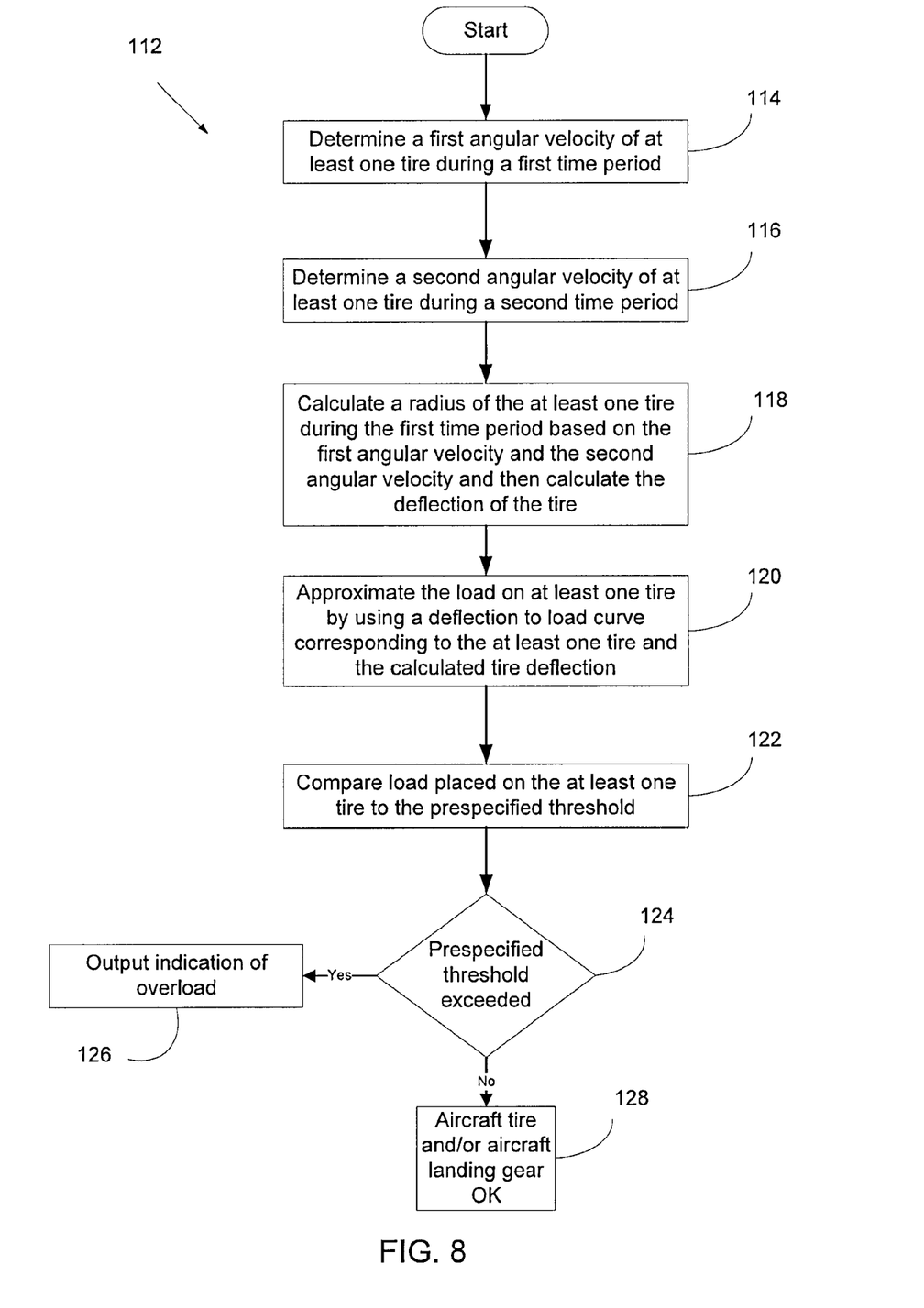
FIG. 8 is a flow chart illustrating exemplary steps for indicating a tire or landing gear overload condition in accordance with the invention.
Figure 9:
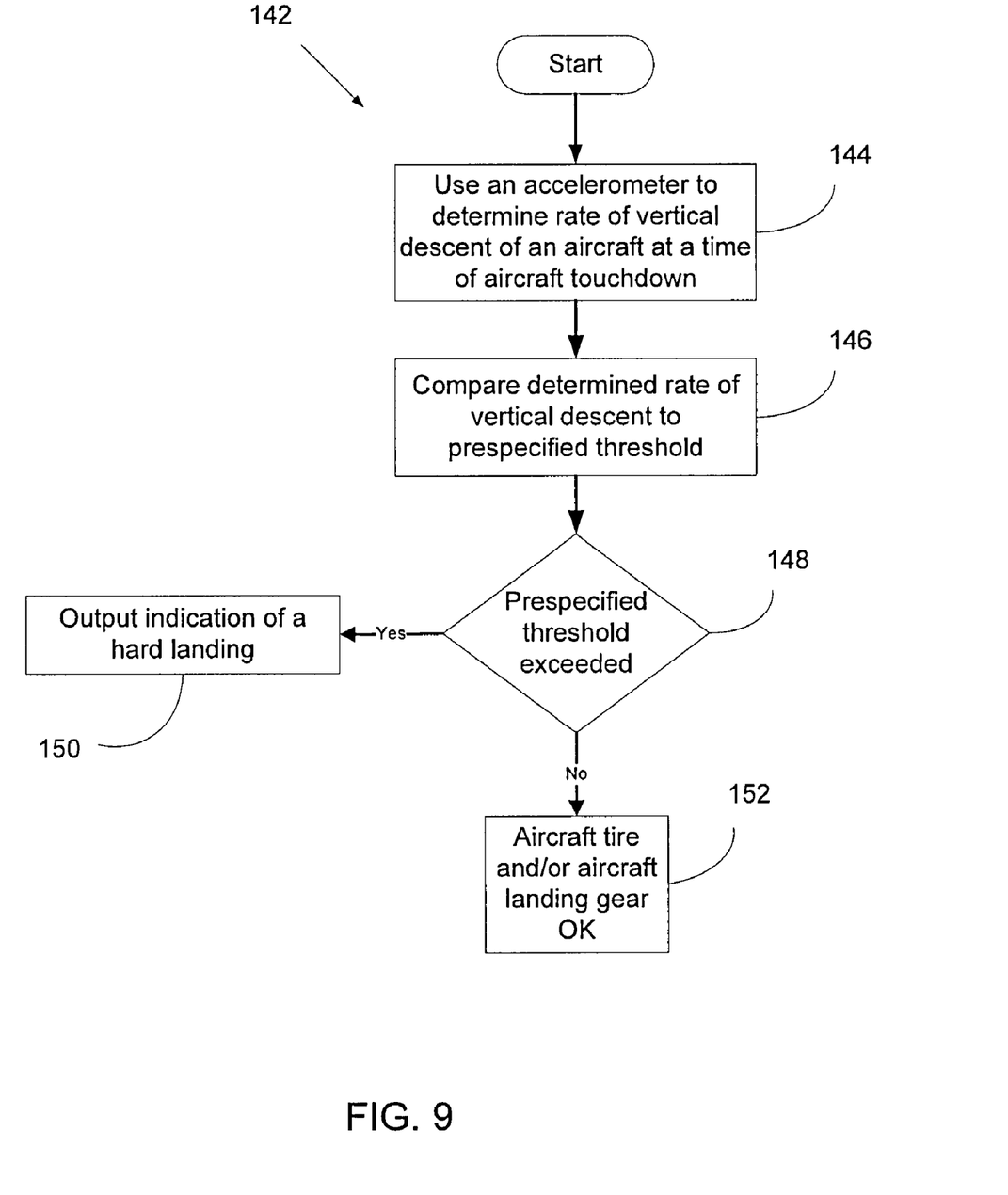
FIG. 9 is a flow chart illustrating exemplary steps for indicating a hard landing condition in accordance with the invention.

Referring now to FIGS. 7-9, there is provided flow diagrams 100, 112, 130 and 142 illustrating exemplary methods for implementing overspeed and overload detection in accordance with the invention. The flow diagrams include a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning with FIG. 7, there is shown exemplary steps for determining a tire overspeed condition. Beginning at block 102, a determination is made of the angular velocity of at least one tire. The angular velocity can be determined by using, for example, the wheel speed sensor 22, which provides the data to the controller 26 as shown in FIG. 2. Next at block 104, the determined angular velocity of the at least one tire is compared to a corresponding prespecified threshold. The threshold in this instance is a velocity threshold, and can be based on the known operational limits of the tire.

Next at block 106, a check is performed to see if the angular velocity of the tire exceeds the prespecified threshold. If the angular velocity of the tire does not exceed the prespecified threshold, then at block 110 an indication that the at least one tire has not experienced an overspeed condition can be output to the cockpit, avionics, maintenance, etc. However, if the determined angular velocity of the at least one tire exceeds the prespecified threshold, then a tire overspeed condition is concluded and an indication that the at least one tire requires inspection, taken out of service, etc. can be output at block 108 to the cockpit, avionics, maintenance, etc. Additionally, at block 108, the overload conditions could be summed up with respect to distance or time, and an indication output when the summed up value exceeds a corresponding threshold.

Moving now to FIG. 8, exemplary steps for determining a tire or landing gear overload condition are shown. Beginning at block 114, a determination is made of a first angular velocity of at least one tire during a first time period after aircraft touchdown (touchdown may be determined based on the weight-on-wheels sensor 29, for example). The angular velocity can be determined by using, for example, a wheel speed sensor 22 as mentioned above. Preferably, the first angular velocity is the peak angular velocity encountered within a predetermined time after detecting weight on the wheels. Next at block 116, a determination is made of a second angular velocity of the at least one tire during a second time period after touchdown, the second time period occurring subsequent to the first time period. The second time period can be, for example, a time when the aircraft tires have settled, that is, when the tire diameter is substantially constant.

Next at block 118, a diameter of the at least one tire is calculated during the first time period based on the first angular velocity and the second angular velocity. This is done using an equation, which utilizes the known diameter of the tire when settled and the angular velocities recorded during landing to derive the diameter of the at least one tire during the first time period. For example, using the equation $d_1 v_1 = d_2 v_2$, where $d_2$ is 50 inches, $v_1$ is 110 radians/second and $v_2$ is 100 radians/second, solving for $d_1$ gives a tire diameter upon impact of 45.45 inches. Based on the calculated tire diameter and the known diameter of the tire on the aircraft under normal conditions, the deflection of the tire can be determined. The diameters are subtracted from one another and the difference represents the deflection of the tire. In the above example, subtracting 45.45 from 50 gives a deflection of 4.55 inches. Then at block 120, the load place on the at least one tire is determined by using the calculated tire deflection from step 118 and a deflection-to-load curve corresponding to the at least one tire to approximate the load on the at least one tire. The approximation is done by selecting the proper curve from FIG. 4 based on the determined deflection, and the corresponding load is determined for the deflection. For example, using curve A and a deflection of 4.55 inches, the load in KIPS for the touchdown is approximately 2.8. The deflection to load curve may be stored in memory 26b of the controller 26 and retrieved when needed.

Next at block 122, the load of the at least one tire is compared to a prespecified threshold, which is a load threshold. Then, at block 124, a check is performed to see if the prespecified threshold for the at least one tire or landing gear has been exceeded. If the prespecified threshold for the at least one tire or landing gear has not been exceeded, then at block 128 an indication that the at least one tire or landing gear has not encountered an overload condition can be output to the cockpit, avionics, maintenance, etc. However, if the determined load of the at least one tire exceeds the prespecified threshold, then a tire overload condition or a landing gear overload condition is concluded and an indication that the at least one tire requires inspection, taken out of service, etc. can be output at block 126 to the cockpit, avionics, maintenance, etc. If in the example the threshold was 2 KIPS, then the threshold would have been exceeded, and an indication output that the tire requires inspection, taken out of service, etc.

In addition to overspeed and tire or landing gear overload detection, the existence of a hard landing at the time of touchdown also can be determined in the controller 26 using data from the accelerometer 24. Referring to block 144 of FIG. 9, a determination is made of the rate of vertical descent (or rate of change in vertical descent) of the aircraft at a time of aircraft touchdown. The rate of vertical descent can be determined by using, for example, the accelerometer 24, which provides the data to the controller 26 as shown if FIG. 2. When the aircraft begins its descent, an initial reading will be output by the accelerometer before returning to a steady state condition. As the aircraft continues its descent, a change in speed of the aircraft will result in the accelerometer outputting another reading. Using the readings from the accelerometer and the times they were taken, the velocities of the aircraft can be determined (e.g., by integrating the accelerometer output data). The velocities can then be used to determine the rate of vertical descent. Next at block 146, the determined rate of vertical descent of the aircraft is compared to a corresponding prespecified threshold. The threshold in this instance is a velocity threshold, and can be based on the operational limits of the aircraft.

Next at block 148, a check is performed to see if the prespecified threshold for the aircraft has been exceeded. If the prespecified threshold for the aircraft has not been exceeded, then at block 110 an indication that the aircraft and its tires and landing gear have not experienced a hard landing condition can be output to the cockpit, avionics, maintenance, etc. However, if the determined rate of vertical descent of the aircraft at the time of touchdown exceeds the prespecified threshold, then a hard landing condition has occurred and an indication that the tires or landing gear of the aircraft require inspection, taken out of service, etc. can be output at block 150 to the cockpit, avionics, maintenance, etc.

Figure 10:
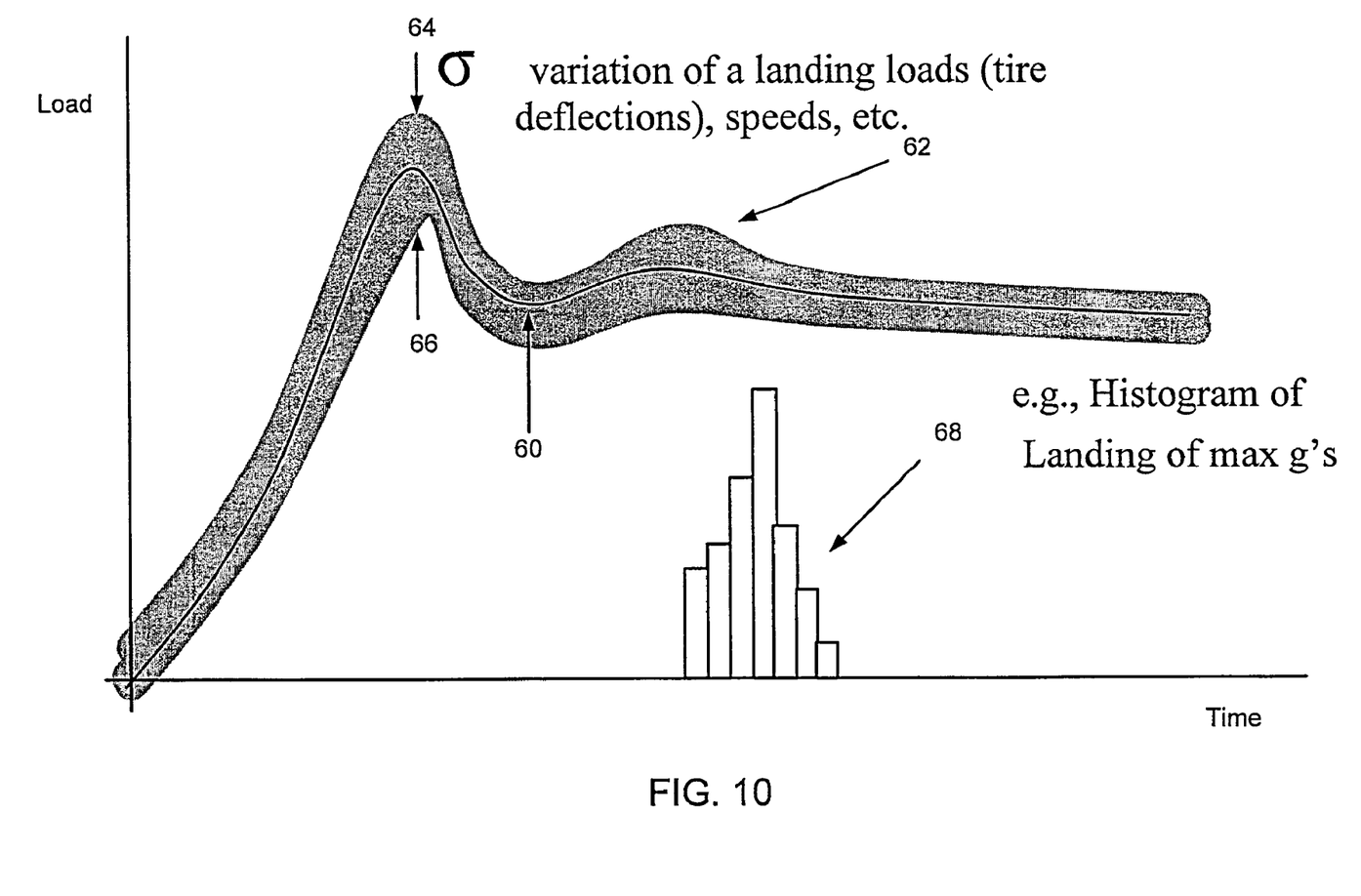
FIG. 10 is an exemplary graph showing simulated aircraft landing load variations.

Referring now to FIG. 10, there is shown an exemplary graph illustrating simulated aircraft landing load variations in relation to time and including a histogram of aircraft landing under a maximum number of g-forces. The graph provides a statistical summary of the aircraft loads (deflection of the tires), but similar graphs can be used showing tire takeoff speeds, landing speeds, forces during turns, landing gear loads, etc. These graphs can show maximums, minimums, typical magnitudes v. time, and statistical deviation, etc. The line represented by reference numeral 60 represents an average of the loads experienced by the tires, while the standard deviation of the landing loads represented by σ has edges of area 62 that represent the maximum and minimum loads experienced by the tires at different times. For example, if the peak of the graph represents the load on the tires at landing, point 64 represents the maximum load experienced and point 66 represents the minimum load experienced during landings.

The histogram represented by reference numeral 68 provides an example of the number of landings that experience the varying amounts of g-forces. The y-axis represents the number of landings and the x-axis represents the amount of g-forces experienced upon aircraft landings. The histogram shows that a majority of landings experience an average amount of g-forces, while the maximum amount of g-forces are experienced by a minority of landings. Along with logging the number of gear landings, the gear extension compression cycles can also be logged and compared to provide an indication of landing gear life.

Further, using known tire deflections under simple rolling conditions at ambient and other BTMS temperatures, load information can be input at various times (avionics can provide roll, pitch and yaw accelerations, etc) to derive a history to provide an estimation of hard landings. Then, by integrating the data, information can be determined about the tires and landing gear out of limit ranges.

Accordingly, a system, method and apparatus for indicating an overload condition for a vehicle, as described herein, can significantly reduce the time spent by maintenance personnel testing the tires and landing gear of an aircraft. Further, since less time is required for maintenance, the aircraft is available to generate revenue.

A person having ordinary skill in the art of computer programming and applications of programming for computer systems would be able in view of the description provided herein to program the BSCU to operate and to carry out the functions described herein. Accordingly, details as to the specific programming code have been omitted for the sake of brevity. Also, while software in the memory or in some other memory of the BSCU may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A controller for indicating an overload condition has occurred during aircraft operation for at least one aircraft tire, wheel and/or at least one aircraft landing gear, said controller configured to:
    receive at least one input indicative of at least one of a load placed on the at least one tire and/or at least one landing gear or an angular velocity of the at least one tire;
    determine, based on the at least one input, if the at least one tire or landing gear corresponding to the at least one tire has exceeded a prespecified threshold; and
    based on the determination, provide an output indicative an overload condition of the at least one tire or the landing gear corresponding to the at least one tire
    wherein the threshold is a velocity threshold, and
    wherein the controller, to determine if the at least one tire or landing gear has exceeded the prespecified threshold, is configured to:
        use an accelerometer to determine a rate of vertical descent of an aircraft at a time of aircraft touchdown;
        compare the determined rate of vertical descent to the prespecified threshold; and
        conclude a hard landing condition has occurred for the at least one tire and/or landing gear corresponding to the at least one tire if the rate of vertical descent of the aircraft exceeds the prespecified threshold.

2. The controller according to claim 1, wherein the output corresponds to at least one of a tire overspeed condition, a tire overload condition, or a landing gear overload condition.

3. A method of indicating an overload condition has occurred for at during aircraft operation for at least one aircraft tire, wheel and/or at least one aircraft landing gear, comprising:
    determining at least one of a load placed on the at least one tire or an angular velocity of the at least one tire;
    determining, based on at least one of the load or the angular velocity, if the at least one tire or landing gear corresponding to the at least one tire has exceeded a prespecified threshold;
    based on the determination, providing an output indicative of an overload condition of the at least one tire or the landing gear corresponding to the at least one tire determining a first angular velocity of the at least one tire during a first time period after aircraft touchdown;

determining a second angular velocity of the at least one tire during a second time period after aircraft touchdown, the second time period occurring subsequent to the first time period; and calculating a radius of the at least one tire during the first time period based on the first angular velocity and the second angular velocity.

4. The method according to claim 3, wherein the output corresponds to at least one of a tire overspeed condition, a tire overload condition, or a landing gear overload condition.

5. The method according to claim 3, wherein the threshold is a velocity threshold, and determining if the at least one tire has exceeded the prespecified threshold includes: comparing the angular velocity of the at least one tire to the prespecified threshold; and concluding a tire overspeed condition has occurred if the angular velocity of the at least one tire exceeds the prespecified threshold.

6. The method according to claim 3, further comprising:
determining a first angular velocity of the at least one tire during a first time period after aircraft touchdown;

determining a second angular velocity of the at least one tire during a second time period after aircraft touchdown, the second time period occurring subsequent to the first time period; and calculating a radius of the at least one tire during the first time period based on the first angular velocity and the second angular velocity.

7. The method according to claim 6, wherein determining the load placed on the at least one tire comprises using the calculated tire radius and a deflection to load curve corresponding to the at least one tire to approximate the load on the at least one tire.

8. The method according to claim 7, wherein the threshold is a load threshold, and determining if the at least one tire or landing gear has exceeded the prespecified threshold includes:

comparing the determined load placed on the at least one tire to the prespecified threshold; and concluding an overload condition has occurred for the at least one tire and/or landing gear corresponding to the at least one tire if the load on the at least one tire exceeds the prespecified threshold.

9. The method according to claim 3, further comprising:
calculating the rate of wheel spinup based on the velocity data; and using the calculated wheel spinup and wheel inertia to determine a coefficient of friction of a runaway surface.

10. The method according to claim 9, further comprising using the determined coefficient of friction to determine runway conditions.

11. An aircraft landing gear system for indicating an overload condition comprising:
a controller for indicating an overload condition has occurred during aircraft operation for at least one aircraft tire, wheel and/or at least one aircraft landing gear, said controller configured to:
receive at least one input indicative of at least one of a load placed on the at least one tire and/or at least one landing gear or an angular velocity of the at least one tire;
determine, based on the at least one input, if the at least one tire or landing gear corresponding to the at least one tire has exceeded a prespecified threshold; and
based on the determination, provide an output indicative an overload condition of the at least one tire or the landing gear corresponding to the at least one tire;
the controller having a plurality of inputs;
at least one aircraft landing gear and at least one tire associated with the at least one landing gear; and
a wheel speed sensor operatively coupled to one of the plurality of inputs, wherein the at least one aircraft tire comprises a wheel speed sensor configured to provide data indicative of a velocity of the at least one tire.

12. The aircraft landing gear system of claim 11, further comprising an accelerometer operatively coupled to one of the plurality of inputs, wherein the accelerometer is used to determine a hard landing.

13. A method of indicating an overload condition has occurred for at during aircraft operation for at least one aircraft tire, wheel and/or at least one aircraft landing gear, comprising:
determining at least one of a load placed on the at least one tire or an angular velocity of the at least one tire;

determining, based on at least one of the load or the angular velocity, if the at least one tire or landing gear corresponding to the at least one tire has exceeded a prespecified threshold;

based on the determination, providing an output indicative of an overload condition of the at least one tire or the landing gear corresponding to the at least one tire;

wherein the threshold is a velocity threshold, and determining if the at least one tire or landing gear has exceeded the prespecified threshold by a method comprising:
using an accelerometer to determine a rate of vertical descent of an aircraft at a time of aircraft touchdown;

comparing the determined rate of vertical descent to the prespecified threshold; and concluding a hard landing condition has occurred for the at least one tire and landing gear corresponding to the at least one tire in response to the rate of vertical descent of the aircraft exceeding the prespecified threshold.

* * * * *